United States Patent [19]

Akimoto et al.

[11] Patent Number: 5,602,613
[45] Date of Patent: Feb. 11, 1997

[54] LENS DRIVING DEVICE

[75] Inventors: Kazuo Akimoto; Hiroto Tsuyuki; Miyoshi Tanikawa, all of Yotsukaido, Japan

[73] Assignee: Seiko Precision Inc., Japan

[21] Appl. No.: 527,783

[22] Filed: Sep. 13, 1995

[30] Foreign Application Priority Data

Sep. 13, 1994 [JP] Japan ................................. 6-218859

[51] Int. Cl.[6] .............................. G03B 13/36; G02B 7/28
[52] U.S. Cl. ......................... 396/133; 250/201.2; 396/91
[58] Field of Search .................................. 354/400, 402, 354/412; 359/823; 250/201.2

[56] References Cited

U.S. PATENT DOCUMENTS

| | | | |
|---|---|---|---|
| 4,423,934 | 1/1984 | Lambeth et al. | 354/412 |
| 4,924,253 | 5/1990 | Imai et al. | 354/400 |
| 5,274,416 | 12/1983 | Kawasaki et al. | 354/412 |

*Primary Examiner*—W. B. Perkey
*Attorney, Agent, or Firm*—Adams & Wilks

[57] ABSTRACT

A lens driving device for a camera or the like drives a lens through a correct distance by the distance through which the lens is driven being corrected according to errors in mechanical parts; as a result it is not necessary for the mechanical parts to be made of high precision, and maintenance of molds used in their manufacture can therefore be made easy.

3 Claims, 6 Drawing Sheets

LENS DRIVING DEVICE

BACKGROUND OF THE INVENTION

This invention relates to a driving device for driving an object lens or the like in a camera or the like.

Conventional driving devices for driving an object lens in a camera drive the lens by means of a helicoid screw or a feed screw to changeover a focus adjustment or a focal distance, and because the distance through which the lens is driven affects the resolution of the lens, high-precision control is required and it has been necessary for the precision and tolerances of mechanical parts to be made high in order to carry out the desired lens driving. Consequently, when these mechanical parts are manufactured by plastic molding or the like, there has been the problem that repeated mold maintenance has been necessary to maintain the precision of the parts.

SUMMARY OF THE INVENTION

Accordingly, it is an object of the present invention to carry out desired lens driving by correcting with respect to errors of individual mechanical parts the distance through which the lens is driven and thereby make it unnecessary for the mechanical parts to be of high precision and make mold maintenance easy.

To achieve the above-mentioned object and other objects, a lens driving device of the invention comprises: a lens barrel movable in an optical axis direction; driving means for driving the lens barrel; correcting means for correcting the distance through which the lens barrel is driven; and control means for controlling the driving means, and when the distance through which the lens barrel is driven exceeds a prescribed value the driving means is controlled based on a correction value outputted by the correcting means.

Also, a lens driving device of the invention comprises: a lens barrel movable in an optical axis direction; driving means for driving the lens barrel; correcting means for correcting the distance through which the lens barrel is driven; and control means for controlling the driving means, and when the distance through which the lens barrel is driven exceeds half a minimum driving distance the driving means is controlled based on a correction value outputted by the correcting means.

Also, a lens driving device of the invention comprises: a lens barrel movable in an optical axis direction; driving means for driving the lens barrel; correcting means for correcting the distance through which the lens barrel is driven; and control means for controlling the driving means, and when the distance through which the lens barrel is driven exceeds a prescribed value with a distance at which focus regulation of an object lens is carried out as a reference the driving means is controlled based on a correction value outputted by the correcting means.

In a lens driving device of the invention, a correction value of the distance through which the lens is driven is stored in the correcting means according to errors in mechanical parts constituting the lens driving device, and lens driving is carried out with a correction based on the correction value made to the distance through which the lens is driven according to predetermined calculation results.

DETAILED DESCRIPTION OF THE PREFERRED EMBODIMENTS

Figure 1:
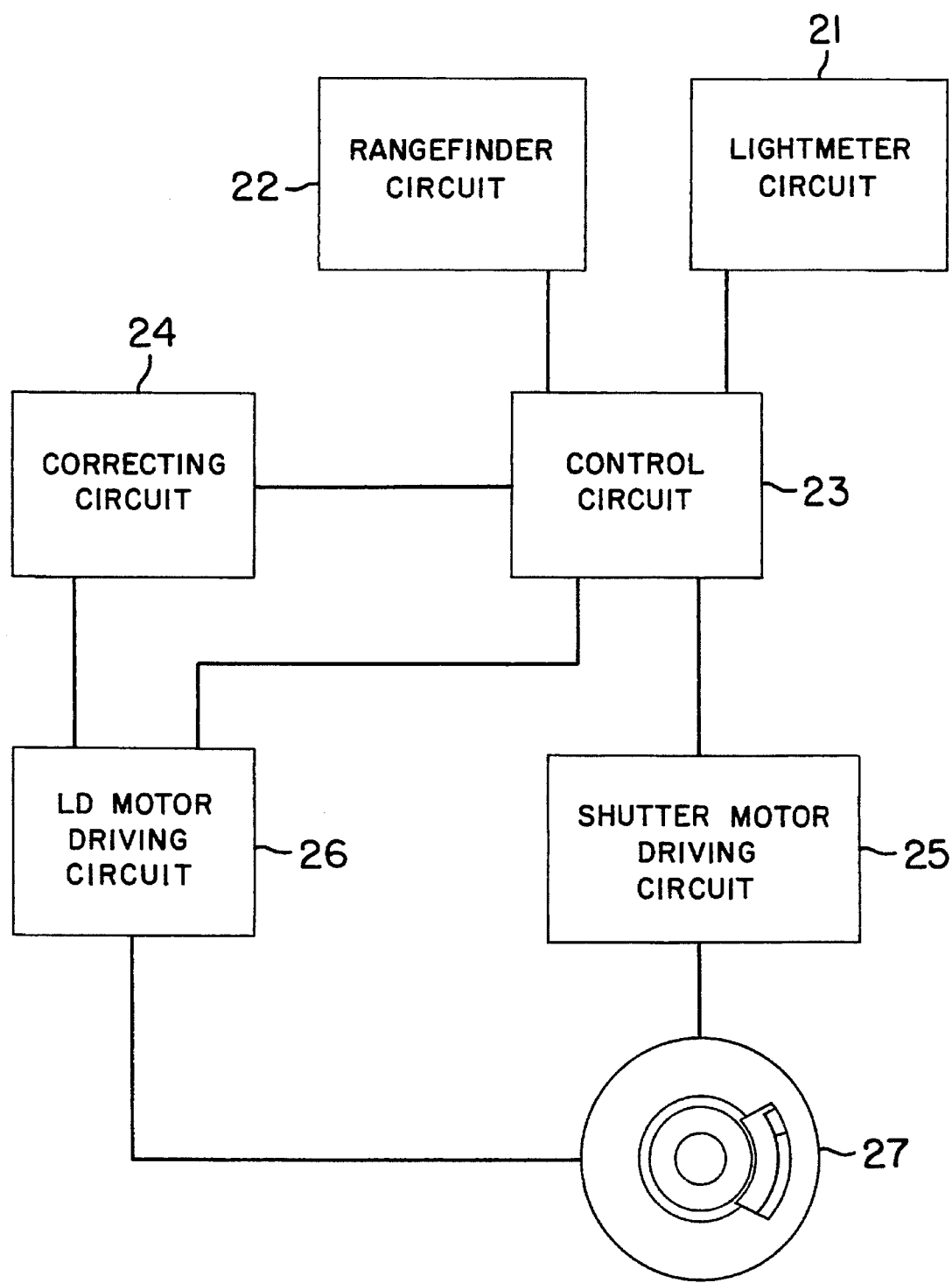
FIG. 1 is a block diagram of a preferred embodiment of the invention.

The invention will now be described in detail with reference to a preferred embodiment shown in the accompanying drawings. In FIG. 1, a lightmeter circuit 21 has a conventional light-receiving device for measuring the luminance of a subject and outputs a subject luminance information signal. A rangefinder circuit 22 is part of a device for measuring the distance to a subject and outputs a measured distance signal. A control circuit 23 outputs an operation signal to a shutter motor driving circuit 25 based on the luminance information signal from the lightmeter circuit 21 and outputs an operation signal to an LD motor driving circuit 26 based on the distance signal from the rangefinder circuit 22. Here, the control circuit 23 controls the LD motor driving circuit 26 based on data from a correcting circuit 24 which will be further discussed later.

Figure 2:
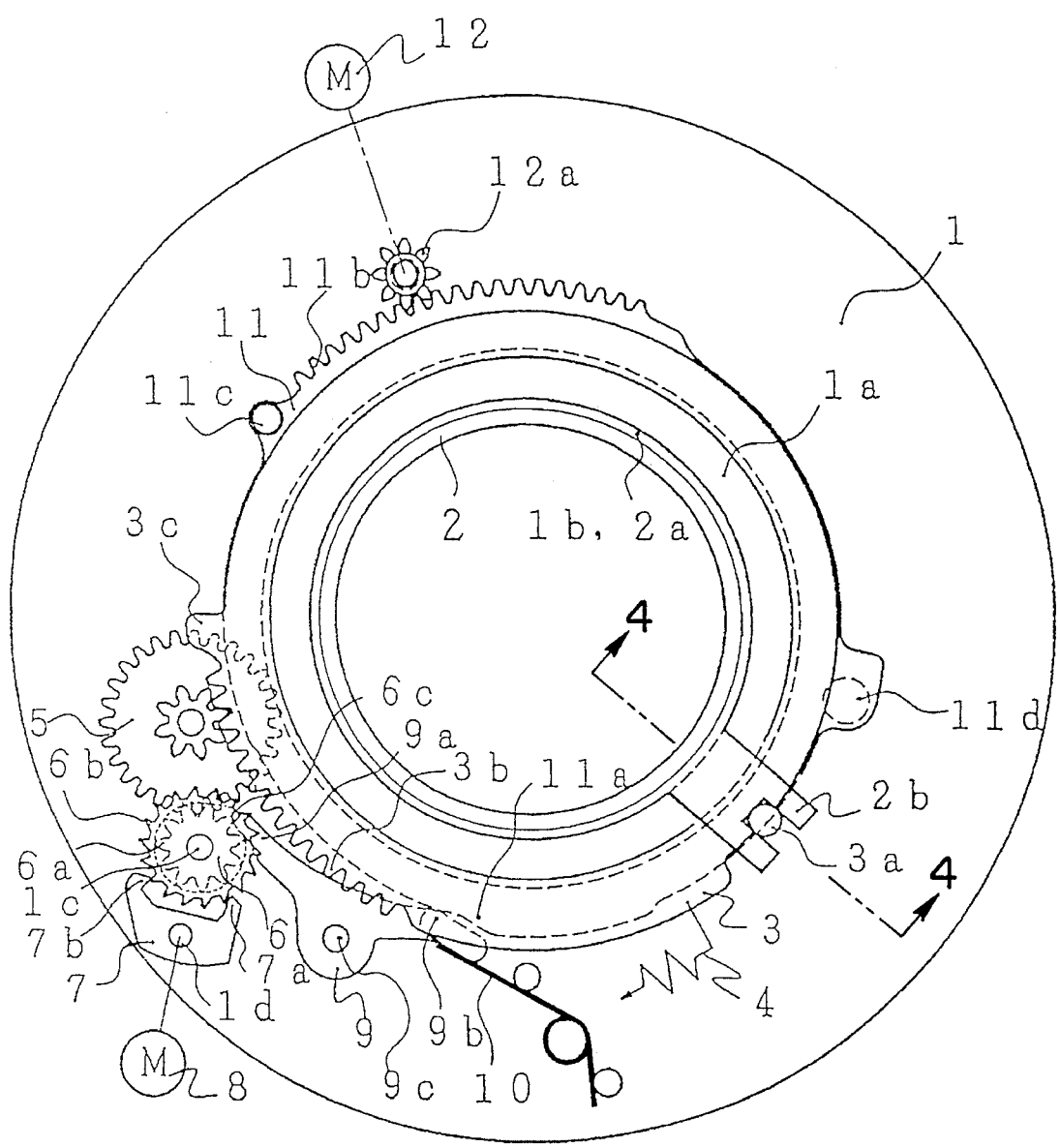
FIG. 2 is a view of the construction of a lens driving part of the preferred embodiment of the invention.
Figure 3:
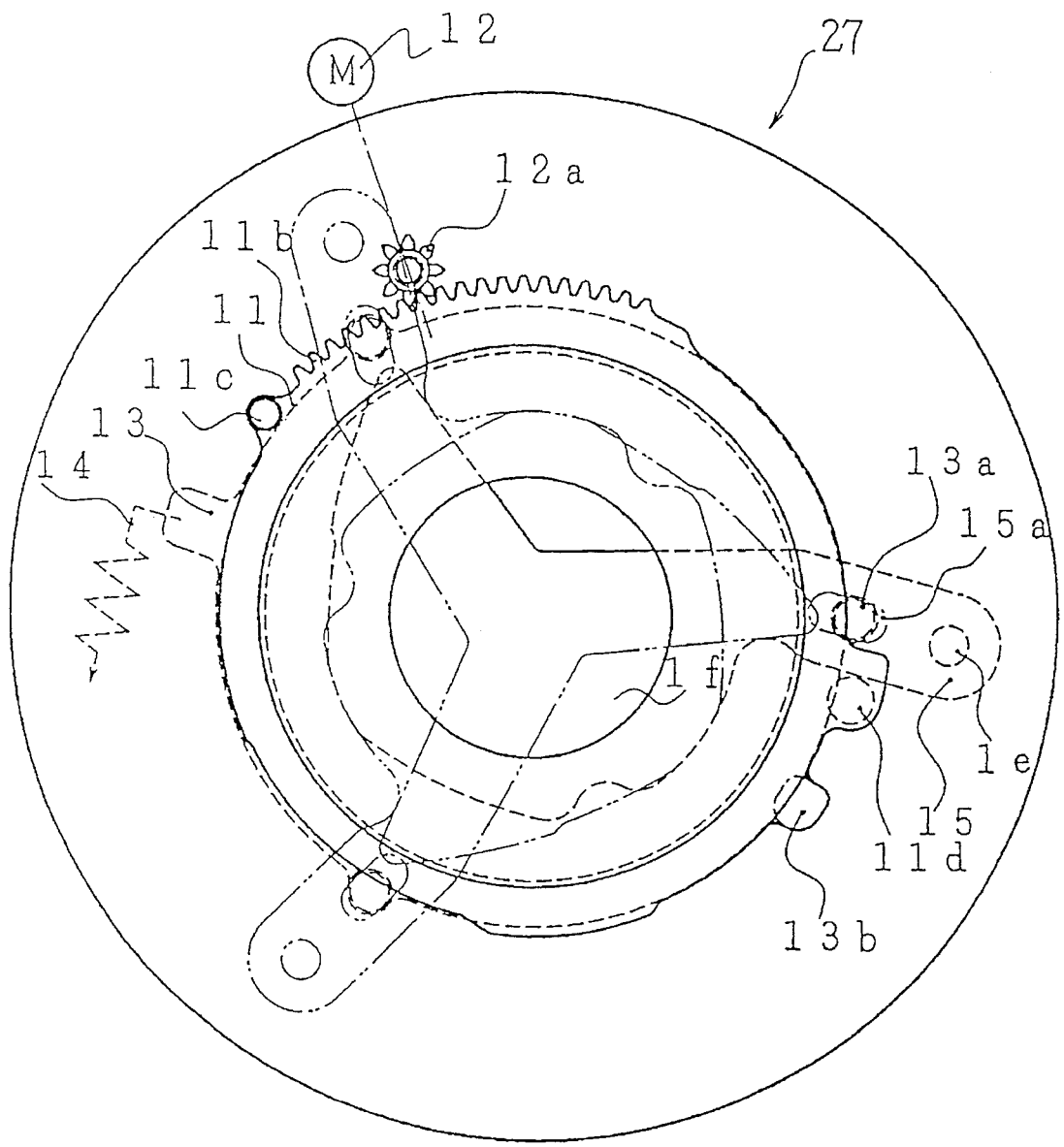
FIG. 3 is a view of the construction of a sector control portion of the preferred embodiment of the invention.
Figure 4:
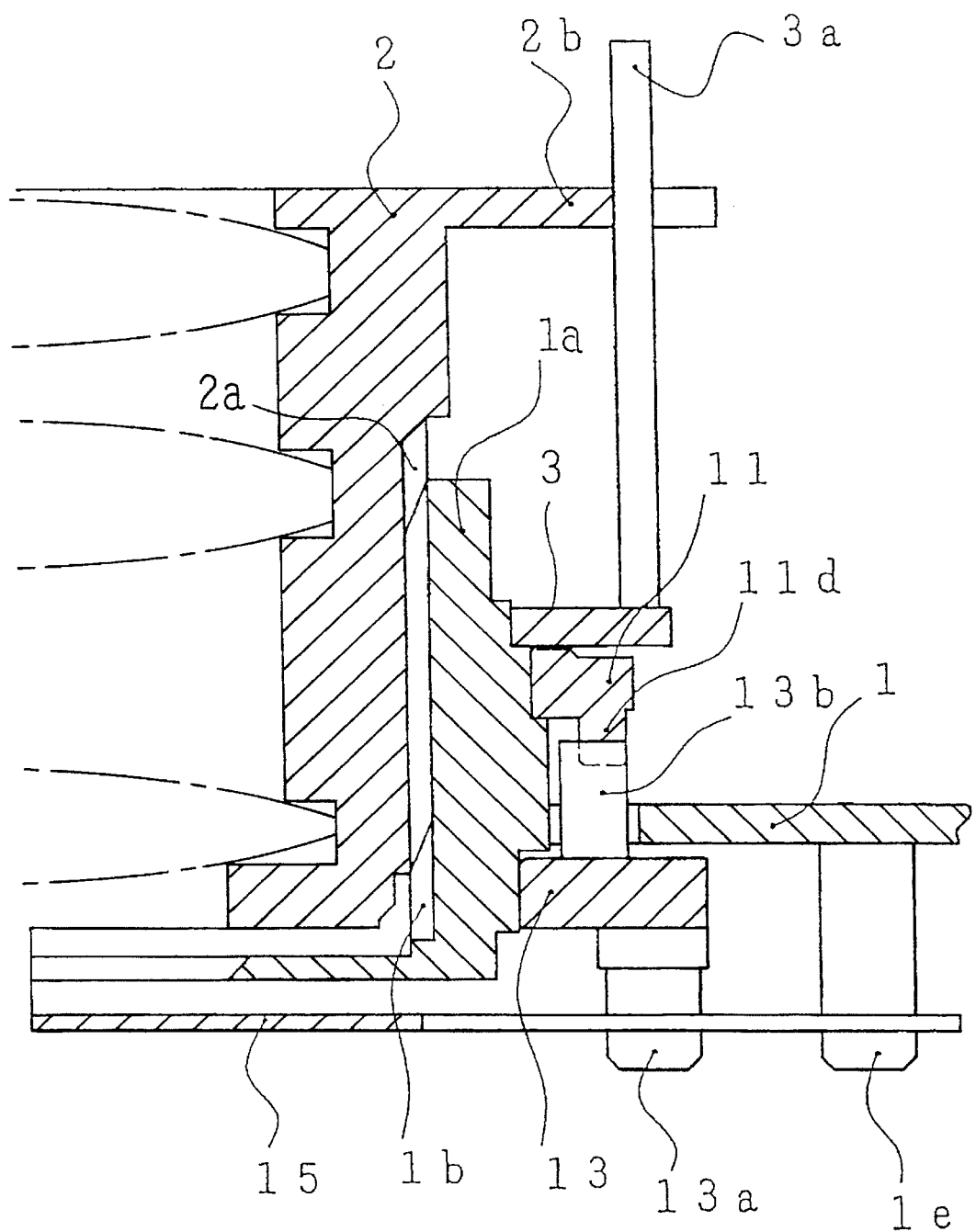
FIG. 4 is a sectional view of the construction of the preferred embodiment of the invention.

A shutter 27 has a shutter motor 8 and a lens motor 12 as shown in FIG. 2 to FIG. 4, and these motors are respectively controlled by the shutter motor driving circuit 25 and the LD motor driving circuit 26.

FIG. 2 shows the initial state of the shutter 27 before it operates. Referring to FIG. 2, a shutter base plate 1 has a lens barrel support member 1a which supports a lens barrel 2. A female helicoid 1b is cut in the inner surface of the lens barrel support member 1a, and a male helicoid 2a formed on the lens barrel 2 screws into this female helicoid 1b. As a result the lens barrel 2 moves in the optical axis direction along with a rotation which will be further discussed later and moves an object lens to a focus position or changes the focal distance thereof.

A lens setting ring 3 is rotatably fitted on the outside of the lens barrel support member 1a to rotate the lens barrel 2. This lens setting ring 3 has a projecting portion 3a. This projecting portion 3a engages with an engaging portion 2b of the lens barrel 2, and the lens barrel 2 rotates integrally with the lens setting ring 3. This lens setting ring 3 is rotationally urged clockwise by a spring 4.

The lens setting ring 3 has a gear 3b and is linked to a gear 6a of a ratchet 6 by way of an idler 5. The ratchet 6 rotates about a shaft 1c on the shutter base plate 1. A plurality of teeth 6b are formed at a uniform pitch on the outer circumference of the ratchet 6. An anchor 7 rocks about a shaft 1d on the shutter base plate 1 and has a pair of engaging pawls 7a, 7b formed thereon, and these engaging pawls 7a, 7b mesh with the teeth 6b of the ratchet 6. The meshing positions of the engaging pawls 7a, 7b and the teeth 6b of the ratchet 6 are staggered phasewise by half the pitch of the teeth 6b. That is, when the anchor 7 rocks from a state wherein the engaging pawl 7a is in engagement with the teeth 6b of the ratchet 6 to a state wherein the engaging pawl 7b is in engagement with the teeth 6b, the ratchet 6 is rotated by the urging of the spring 4 by way of the idler 5 through an angle corresponding to half the pitch of the teeth 6b. To rock this anchor 7, a reversible rocking motor 8 is connected to the anchor 7.

The ratchet 6 comprises in a stack a gear 6a, the teeth 6b and portions to be engaged with 6c. In the position shown in FIG. 2 showing the initial state of the lens, an engaging portion 9a of an engaging lever 9 engages with a portion for being engaged with 6c and restrains the ratchet 6. The engaging lever 9 is urged by a spring 10 in a direction such that the engaging portion 9a engages with the portion for being engaged with 6c of the ratchet 6. When a driving ring 11 rotates clockwise, the other end portion 9b of the engaging lever 9 is pushed by a cam portion 11a of the driving ring 11 and pivots about a shaft 9c and the engaging portion 9a is disengaged from the portion for being engaged with 6c. The driving ring 11 is rotatably fitted on the outside of the lens barrel support member 1a of the shutter base plate 1. The driving ring 11 has a gear portion 11b which meshes with a gear 12a and is rotatable in forward and reverse directions thereby. A pin 11c of the driving ring 11 engages with an engaging portion 3c of the lens setting ring 3 and rotates the lens setting ring 3 counterclockwise against the resistance of the spring 4.

FIG. 3 shows a sector control portion disposed on the rear side of the shutter base plate 1. Referring to FIG. 1, a sector ring 13 is rotatably fitted on the outside of the lens barrel support member 1a of the shutter base plate 1 and is urged counterclockwise by a spring 14. A long hole 15a in a sector 15 is fitted over a pin 13a of the sector ring 13, and along with rotation of the sector ring 13 the sector 15 rotates about a fixed shaft 1e provided on the shutter base plate 1. An engaging portion 13b of the sector ring 13 is can engage with a pin 11d of the driving ring 11, and when the driving ring 11 rotates clockwise the sector ring 13 also rotates against the resistance of the spring 14.

Figure 5:
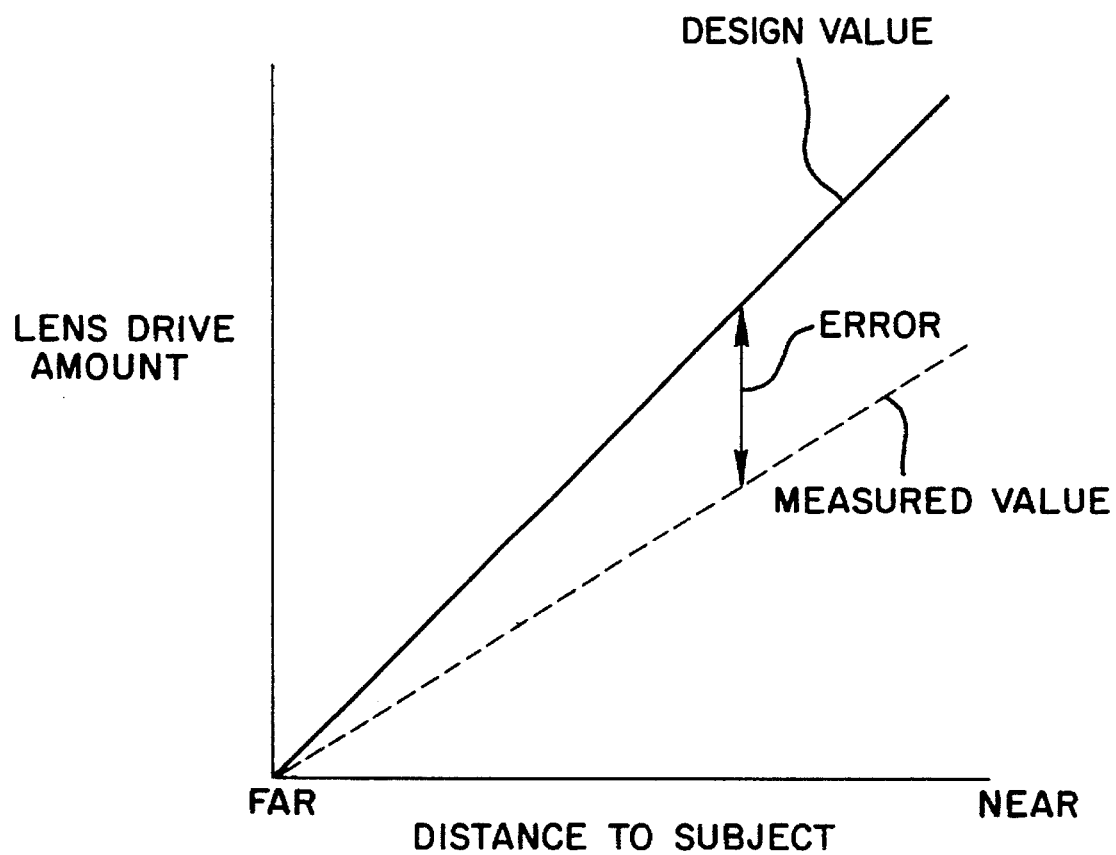
FIG. 5 is a graph of distance through which the lens is driven before correction.
Figure 6:
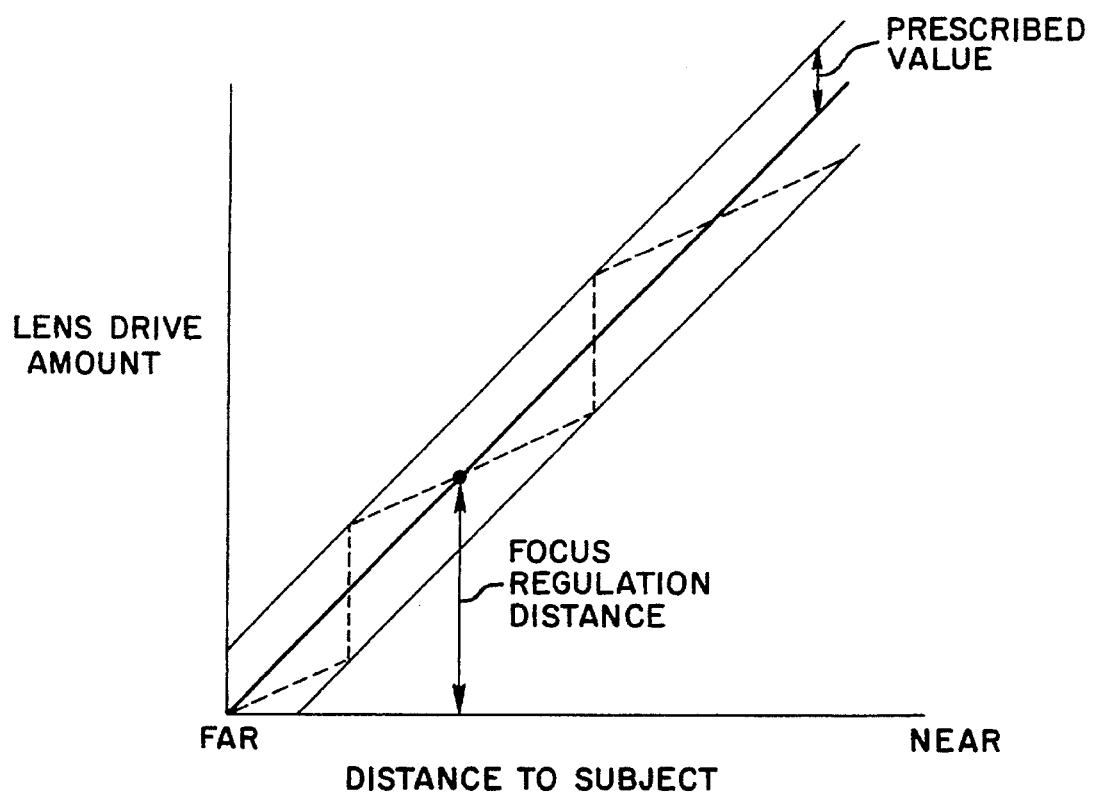
FIG. 6 is a graph of distance through which the lens is driven after correction.

Next, correction of the lens drive will be explained with reference to FIG. 5 and FIG. 6. The construction of the mechanical parts determining the distance through which the lens is driven is that as described above the output of the rocking motor 8 is transmitted to the lens barrel 2 by a transmission mechanism, and backlash and clearances occur depending on the precision and errors of these mechanical parts of the transmission mechanism, and consequently the distance through which the lens is driven with respect to a design reference value falls short and the shortfall in the distance through which the lens is driven increases with the distance itself. However, because these mechanical parts of the transmission mechanism are molded, the shortfall in the distance through which the lens driven is not one of which dispersion occurs among individual shutters but is stable and substantially uniform among shutters. Accordingly, before the start of manufacture in a plurality of shutters the distance at which focus regulation of the object lens is carried out is made a reference, the distance through which the lens barrel is driven is measured for several distances, it is determined whether or not the distance through which the lens barrel is driven constituting a prescribed value ΔD is greater than ½ a minimum drive distance ΔP, and corrections are made at points where the prescribed value ΔD is exceeded. To make corrections, the correcting circuit 24 stores correction values in an EEPROM (Electric Erasable Programmable Read Only Memory), which is a nonvolatile read/writable memory, control is carried out by the control circuit 23 according to calculated results calculated from outputs of the lightmeter circuit 21 and the rangefinder circuit 22, and the distance through which the lens is driven is corrected in the direction of the driving based on a correction value outputted by the correcting circuit 24 to effect the desired lens driving.

In this preferred embodiment, the construction of the lens drive was described using the example of a helicoid screw, but this may alternatively be a feed screw. Also, although in the preferred embodiment described above the lens focus regulation point was used as the matching reference, the reference may be set to any distance.

With this invention, correct distances through which the lens is driven are obtained by correcting the distance through which the lens is driven according to errors in mechanical parts; as a result it is not necessary for the mechanical parts to be made of high precision, and therefore mold maintenance can be made easy.

What is claimed is:

1. A lens driving device comprising:

a lens barrel movable in an optical axis direction;

driving means for driving the lens barrel;

correcting means for correcting the distance through which the lens barrel is driven; and control means for controlling the driving means, wherein when the distance through which the lens barrel is driven exceeds a prescribed value, the driving means is controlled based on a correction value outputted by the correcting means.

2. A lens driving device comprising:

a lens barrel movable in an optical axis direction;

driving means for driving the lens barrel;

correcting means for correcting the distance through which the lens barrel is driven; and control means for controlling the driving means, wherein when the distance through which the lens barrel is driven exceeds ½ a minimum drive distance, the driving means is controlled based on a correction value outputted by the correcting means.

3. A lens driving device comprising:

a lens barrel movable in an optical axis direction;

driving means for driving the lens barrel;

correcting means for correcting the distance through which the lens barrel is driven; and control means for controlling the driving means, wherein when the distance through which the lens barrel is driven exceeds a prescribed value with a distance at which focus regulation of an object lens is carried out as a reference the driving means is controlled based on a correction value outputted by the correcting means.

* * * * *